United States Patent
Chang et al.

(10) Patent No.: US 12,090,850 B2
(45) Date of Patent: Sep. 17, 2024

(54) HEAD-UP DISPLAY WITH ADAPTIVE COLOR PALETTE

(71) Applicant: GM Global Technology Operations LLC, Detroit, MI (US)

(72) Inventors: Kai-Han Chang, Sterling Heights, MI (US); Thomas A. Seder, Fraser, MI (US)

(73) Assignee: GM GLOBAL TECHNOLOGY OPERATIONS LLC, Detroit, MI (US)

( * ) Notice: Subject to any disclaimer, the term of this patent is extended or adjusted under 35 U.S.C. 154(b) by 208 days.

(21) Appl. No.: 17/818,160

(22) Filed: Aug. 8, 2022

(65) Prior Publication Data

US 2024/0042851 A1   Feb. 8, 2024

(51) Int. Cl.
*B60K 35/00* (2024.01)
*B60K 35/10* (2024.01)
*B60K 35/29* (2024.01)
*B60K 35/60* (2024.01)
*B60K 35/23* (2024.01)

(52) U.S. Cl.
CPC .............. *B60K 35/00* (2013.01); *B60K 35/10* (2024.01); *B60K 35/23* (2024.01); *B60K 35/29* (2024.01); *B60K 35/60* (2024.01); *B60K 2360/1438* (2024.01); *B60K 2360/188* (2024.01); *B60K 2360/334* (2024.01); *B60K 2360/349* (2024.01); *B60K 2360/785* (2024.01)

(58) Field of Classification Search
CPC ........ B60K 35/00; B60K 35/10; B60K 35/23; B60K 35/29; B60K 35/60; B60K 2360/1438; B60K 2360/188; B60K 2360/334; B60K 2360/349; B60K 2360/785; B60K 35/234; B60K 35/28; B60K 35/81; G02B 27/0101; G02B 2027/0112; G02B 2027/0118; G02B 2027/014; G09G 5/06; G09G 2320/0233; G09G 2320/0626
USPC .......................................................... 701/36
See application file for complete search history.

(56) References Cited

U.S. PATENT DOCUMENTS

| | | | |
|---|---|---|---|
| 11,699,368 B1* | 7/2023 | Chang ...................... | G06T 7/80 |
| | | | 345/207 |
| 2010/0265048 A1* | 10/2010 | Lu ............................ | B60R 1/26 |
| | | | 340/435 |

(Continued)

*Primary Examiner* — Tyler D Paige
(74) *Attorney, Agent, or Firm* — Vivacqua Crane, PLLC (57) ABSTRACT

A head-up display for displaying graphics upon a windscreen of a vehicle includes a graphic projection module for generating images upon the windscreen of the vehicle, a user input device for receiving user-generated commands created by a user of the vehicle, and one or more controllers in electronic communication with the graphic projection module and the user input device. The controller executes instructions to instruct the graphic projection module to generate a luminance adjustment graphic, where the luminance adjustment graphic includes an adaptive color palette graphic including two or more colors. The controller receives, from the user input device, a user-generated luminance input indicating a change in a level of luminance in a selected color, where the change in the level of luminance in the selected color is selected by the user to discern differences between the two or more colors caused by a color vision deficiency.

20 Claims, 4 Drawing Sheets

(56) References Cited

U.S. PATENT DOCUMENTS

| | | | |
|---|---|---|---|
| 2011/0175925 A1* | 7/2011 | Kane | G01J 1/4204 |
| | | | 345/589 |
| 2014/0309806 A1* | 10/2014 | Ricci | H04W 48/04 |
| | | | 701/1 |
| 2019/0025584 A1* | 1/2019 | Dai | G02B 27/017 |
| 2019/0095729 A1* | 3/2019 | Dai | G06T 11/001 |
| 2019/0378449 A1* | 12/2019 | VanderWel | G09G 3/2003 |
| 2021/0122388 A1* | 4/2021 | Qiu | G02B 27/0093 |

* cited by examiner

HEAD-UP DISPLAY WITH ADAPTIVE COLOR PALETTE

INTRODUCTION

The present disclosure relates to a head-up display that generates an adaptive color palette, where the adaptive color palette accommodates color vision deficiencies of a user.

A head-up display (HUD) shows information such as, for example, vehicle speed and navigational instructions, directly onto a windscreen of a vehicle, within the driver's forward field of view. Accordingly, the head-up display provides drivers with information without looking away from the road. For example, the head-up display may generate graphics upon the windshield of the vehicle including information such as vehicle speed and navigational information.

The three main types of color vision deficiencies are protanomaly, which is an anomalous response to long wavelength light by the L-cones in the retina, deuteranomaly, which is an anomalous response to medium wavelength light by the M-cones in the retina, and tritanomaly, which is an anomalous response to short wavelength light by S-cones in the retina. It is to be appreciated that the graphics generated by the head-up display do not account for color vision deficiencies that may occur in individuals. In particular, usability assessments for a head-up display do not typically account for the likelihood of confusion between different colors for customers who are affected with color vision deficiencies. Accordingly, the graphics generated by a head-up display may be confusing for some customers who are affected with color vision deficiencies.

Thus, while current head-up displays achieve their intended purpose, there is a need in the art for an improved head-up display that accommodates individuals affected with color vision deficiencies.

SUMMARY

According to several aspects, a head-up display for displaying graphics upon a windscreen of a vehicle is disclosed. The head-up display includes a graphic projection module for generating images upon the windscreen of the vehicle, a user input device for receiving user-generated commands created by a user of the vehicle, and one or more controllers in electronic communication with the graphic projection module and the user input device. The one or more controllers executes instructions to instruct the graphic projection module to generate a luminance adjustment graphic, where the luminance adjustment graphic includes an adaptive color palette graphic including two or more colors. The one or more controllers receive, from the user input device, a user-generated luminance input indicating a change in a level of luminance in a selected color, where the change in the level of luminance in the selected color is selected by the user to discern differences between the two or more colors caused by a color vision deficiency. In response to receiving the user-generated luminance input, the one or more controllers instruct the graphic projection module to adjust the level of luminance of the selected color based on the user-generated luminance input.

In another aspect, the one or more controllers execute instructions to instruct the graphic projection module to generate a luminance adjustment set of text instructions, where the luminance adjustment set of text instructions instruct the user to adjust the level of luminance of the selected color.

In yet another aspect, the one or more controllers execute instructions to instruct the graphic projection module to generate an interactive luminance adjustment graphic, where the interactive luminance adjustment graphic includes a mechanism for allowing the user to adjust the level of luminance of the selected color.

In an aspect, the one or more controllers execute instructions to receive a user-generated input from the user input device indicating the user is unable to discern differences between the two or more colors that are part of the adaptive color palette graphic despite the change in the level of luminance in the selected color. In response to receiving the user-generated input indicating the user is unable to discern the differences between the two or more colors that are part of the adaptive color palette graphic, the one or more controllers instruct the graphic projection module to generate a saturation adjustment graphic.

In another aspect, the one or more controllers execute instructions to receive, from the user input device, a user-generated saturation input indicating a change in a level of saturation in the selected color, where the change in the level of saturation of the selected color is selected by the user to discern differences between the two or more colors caused by a color vision deficiency. In response to receiving the user-generated saturation input, the one or more controllers instruct the graphic projection module to adjust the level of saturation of the selected color based on the user-generated saturation input.

In yet another aspect, the one or more controllers execute instructions to save the selected color with the change in the level of saturation of the selected color in memory of the one or more controllers.

In an aspect, the one or more controllers execute instructions to instruct the graphic projection module to generate a saturation adjustment set of text instructions, where the saturation adjustment set of text instructions instruct the user to adjust the level of saturation of the selected color.

In another aspect, the one or more controllers execute instructions to instruct the graphic projection module to generate an interactive saturation adjustment graphic, where the interactive saturation adjustment graphic includes a mechanism for allowing the user to adjust the level of saturation of the selected color.

In yet another aspect, the one or more controllers execute instructions to instruct the graphic projection module to generate an initial set of text instructions that are displayed along with the adaptive color palette graphic, where the initial set of text instructions are displayed alongside and ask the user to distinguish between the two or more colors that are part of the adaptive color palette graphic.

In an aspect, the one or more controllers execute instructions to receive, from the user input device, a user-generated negative input indicating the user is unable to distinguish between the two or more colors. In response to receiving the user-generated negative input, the one or more controllers instruct the graphic projection module to generate the luminance adjustment graphic.

In another aspect, the adaptive color palette graphic includes three colors.

In yet another aspect, the three colors are red, blue, and green.

In an aspect, the two or more colors that are part of the adaptive color palette graphic include a default luminance value.

In another aspect, the default luminance value is a maximum level of luminance intensity.

In an aspect, a method for displaying graphics upon a windscreen of a vehicle by a head-up display. The method includes instructing, by one or more controllers, a graphic projection module to generate a luminance adjustment graphic, where the luminance adjustment graphic includes an adaptive color palette graphic including two or more colors. The one or more controllers are in electronic communication with the graphic projection module and a user input device. The method includes receiving, from the user input device, a user-generated luminance input indicating a change in a level of luminance in a selected color, where the change in the level of luminance in the selected color is selected by a user to discern differences between the two or more colors caused by a color vision deficiency. In response to receiving the user-generated luminance input, the method includes instructing the graphic projection module to adjust the level of luminance of the selected color based on the user-generated luminance input.

In another aspect, the method includes receiving a user-generated input from the user input device indicating the user is unable to discern differences between the two or more colors that are part of the adaptive color palette graphic despite the change in the level of luminance in the selected color. In response to receiving the user-generated input indicating the user is unable to discern the differences between the two or more colors that are part of the adaptive color palette graphic, the method includes instructing the graphic projection module to generate a saturation adjustment graphic.

In yet another aspect, the method includes receiving, from the user input device, a user-generated saturation input indicating a change in a level of saturation in the selected color, where the change in the level of saturation of the selected color is selected by the user to discern differences between the two or more colors caused by a color vision deficiency. In response to receiving the user-generated saturation input, the method includes instructing the graphic projection module to adjust the level of saturation of the selected color based on the user-generated saturation input.

In an aspect, the method includes saving the selected color with the change in the level of saturation of the selected color in memory of the one or more controllers.

In another aspect, the method includes instructing the graphic projection module to generate an initial set of text instructions that are displayed along with the adaptive color palette graphic, where the initial set of text instructions are displayed alongside and ask the user to distinguish between the two or more colors that are part of the adaptive color palette graphic.

In an aspect, head-up display for displaying graphics upon a windscreen of a vehicle is disclosed. The head-up display includes a graphic projection module for generating images upon the windscreen of the vehicle, a user input device for receiving user-generated commands created by a user of the vehicle, and one or more controllers in electronic communication with the graphic projection module and the user input device. The one or more controllers executes instructions to instruct the graphic projection module to generate a luminance adjustment graphic, where the luminance adjustment graphic includes an adaptive color palette graphic including two or more colors. The one or more controllers receive, from the user input device, a user-generated luminance input indicating a change in a level of luminance in a selected color, where the change in the level of luminance in the selected color is selected by the user to discern differences between the two or more colors caused by a color vision deficiency. In response to receiving the user-generated luminance input, the one or more controllers instruct the graphic projection module to adjust the level of luminance of the selected color based on the user-generated luminance input. The one or more controllers receive a user-generated input from the user input device indicating the user is unable to discern differences between the two or more colors that are part of the adaptive color palette graphic despite the change in the level of luminance in the selected color. In response to receiving the user-generated input indicating the user is unable to discern the differences between the two or more colors that are part of the adaptive color palette graphic, the one or more controllers instruct the graphic projection module to generate a saturation adjustment graphic.

Further areas of applicability will become apparent from the description provided herein. It should be understood that the description and specific examples are intended for purposes of illustration only and are not intended to limit the scope of the present disclosure.

BRIEF DESCRIPTION OF THE DRAWINGS

The drawings described herein are for illustration purposes only and are not intended to limit the scope of the present disclosure in any way.

DETAILED DESCRIPTION

The following description is merely exemplary in nature and is not intended to limit the present disclosure, application, or uses.

Figure 1:
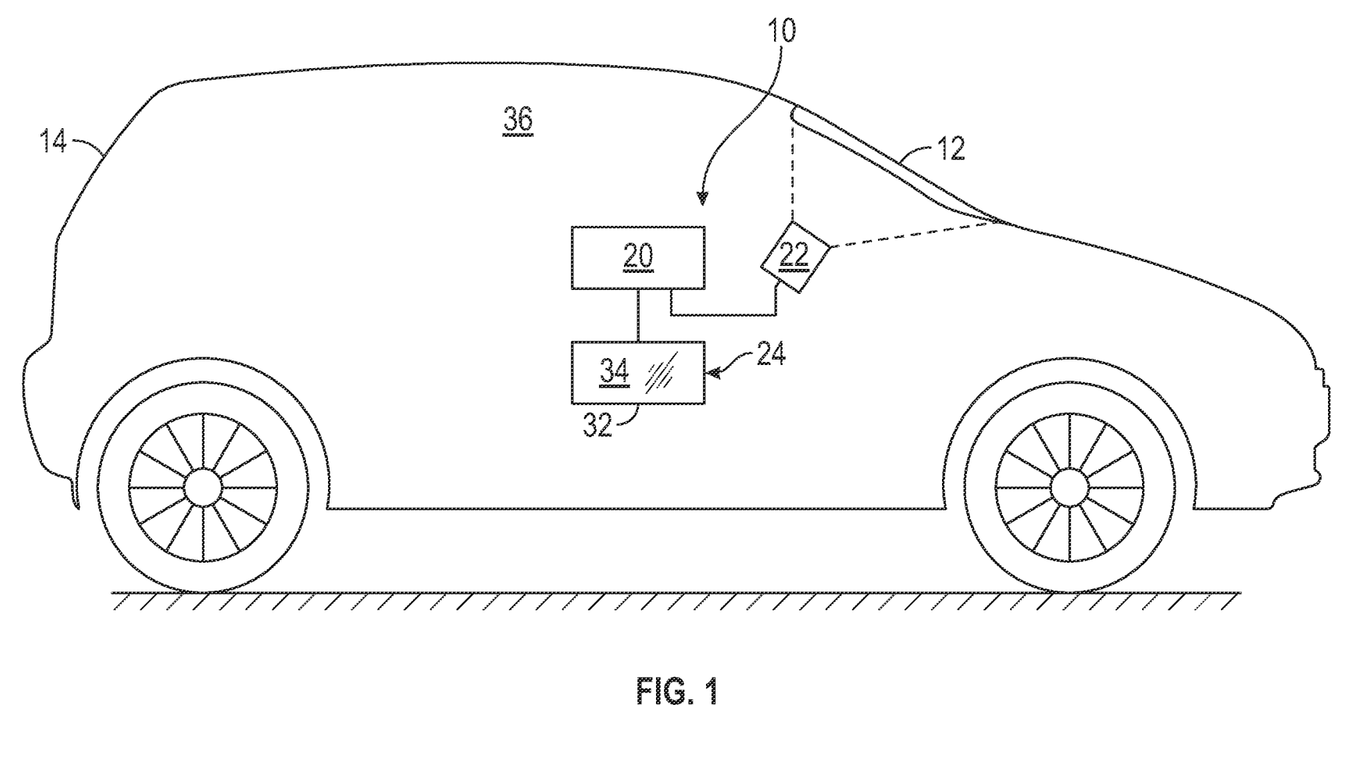
FIG. 1 is a schematic diagram of the disclosed head-up display system including a controller in electronic communication with a graphic projection module and a user input device, according to an exemplary embodiment.

Referring to FIG. 1, an exemplary head-up display 10 for generating graphics upon a windscreen 12 of a vehicle 14 is shown. As explained below, the head-up display 10 accommodates color vision deficiencies of a user of the vehicle 14 by adjusting the luminance and saturation of one or more colors shown by the head-up display 10. It is to be appreciated that the vehicle 14 may be any type of vehicle such as, but not limited to, a sedan, truck, sport utility vehicle, van, or motor home. Furthermore, although FIG. 1 illustrates a vehicle 14, it is to be appreciated that the disclosed head-up display 10 is not limited to automotive applications and may be used in a variety of other displays as well. For example, in another embodiment, the disclosed approach for accommodating color vision deficiencies may be used for persons with color perception issues interacting with head-worn displays systems, such as the head-worn displays that are used in virtual reality and augmented reality glasses. Some other examples of devices that may employ the disclosed approach for accommodating color vision deficiencies include smartphone displays and gaming displays.

The head-up display 10 includes one or more controllers 20 in electronic communication a graphic projection module 22 and a user input device 24. The graphic projection module 22 is configured to generate images upon the windscreen 12 of the vehicle 14 and includes a projection device for creating an excitation light for projecting images. The user input device 24 is any type of device for receiving user-generated commands created by a user of the vehicle 14. In the non-limiting embodiment as shown, the user input device 24 is a head-down display 32 including a touchscreen 34 for receiving user-generated commands. The head-down display 32 may be located alongside or below an instrument panel (not illustrated) located within an interior cabin 36 of the vehicle 14. However, it is to be appreciated that the user input device 24 is not limited to a head-down display 32. For example, in an alternative embodiment the user input device 24 may be a keyboard, microphone, or gesture sensor.

Figure 2A:
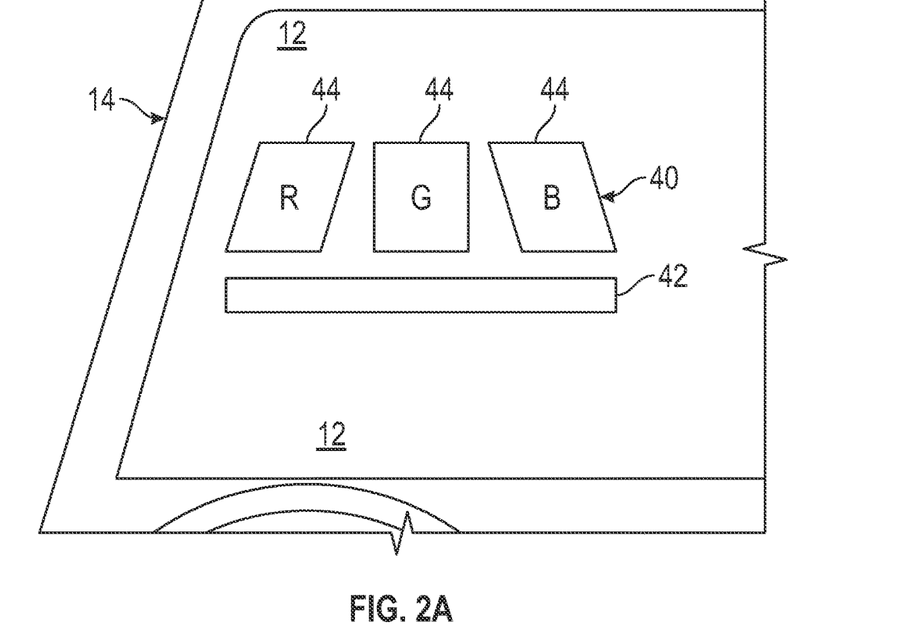
FIG. 2A is an interior view of the windscreen as the head-up display system generates an adaptive color palette graphic and an initial set of text instructions upon the windscreen, according to an exemplary embodiment.

FIG. 2A is an exemplary interior view of the windscreen 12 as the one or more controllers 20 execute a color adjustment mode. Referring to both FIGS. 1 and 2A, during the color adjustment mode the head-up display 10 generates an adaptive color palette graphic 40 and an initial set of text instructions 42 upon the windscreen 12. The adaptive color palette graphic 40 includes two or more colors 44. In the example as shown in FIG. 2A, the adaptive color palette graphic 40 includes three colors 44, red, green, and blue (where the R, G, and B stand for red, green, and blue, respectively). However, in another embodiment, the adaptive color palette graphic 40 may only include two colors 44. Specifically, in one embodiment, the two colors 44 are red and blue. It is to be appreciated that green may not be used since the color green since the human eye is most sensitive to green. However, in embodiments, the two colors 44 may include the color green as well. Furthermore, it is to be appreciated that in an embodiment, the adaptive color palette graphic 40 may include more than three colors 44 as well.

As explained below, during the color adjustment mode the user of the vehicle 14 manipulates the user input device 24 to adjust a level of luminance of at least one of the colors 44 that are part of the adaptive color palette graphic 40, where adjusting the level of luminance changes the luminance intensity. In addition to luminance, the user may also manipulate the user input device 24 to adjust a level of saturation of the at least one color 44 as well, where adjusting the level of saturation changes the saturation intensity. It is to be appreciated that individuals having common color vision deficiencies are able to distinguish changes in luminance and saturation in color. The disclosed head-up display 10 allows for users having color vision deficiencies to customize the luminance and saturation of the colors 44 that are part of the adaptive color palette graphic 40. By changing the luminance and saturation of the one or more colors 44, a user having a color vision deficiency is able to better discern differences between two colors that would normally cause confusion. That is, in other words, a user may be able to tell the differences between two colors 44 that they normally would not be able to because of a color vision deficiency by changing the luminance and saturation. For example, an individual having deuteranomaly, which is a type of red-green color blindness, may adjust the luminance and saturation for the color 44 corresponding to red, which in turn allows the user to discern the differences more easily between red and green.

Referring to FIGS. 1 and 2A, the one or more controllers 20 may receive a prompt to initiate the color adjustment mode. In response to receiving the prompt, the one or more controllers 20 instruct the graphic projection module 22 to generate the adaptive color palette graphic 40 including the two or more colors 44 (three colors 44 are shown in FIG. 2A) in combination with the initial set of text instructions 42 that are displayed along with the adaptive color palette graphic 40, where the initial set of text instructions 42 ask the user to distinguish between the two or more colors 44 that are part of the adaptive color palette graphic 40. For example, in one embodiment, the initial set of text instructions 42 may ask the user "Are the three squares distinguishable?".

If the user is able to see the differences between the colors 44, then the one or more controllers 20 receive a user-generated input from the user input device 24 indicating a positive answer, and the color adjustment mode may then terminate. However, if the user is unable to see the differences between the colors 44, then the one or more controllers 20 receive a user-generated negative input from the user input device 24 indicating that it is not possible to distinguish between the two or more colors 44.

In an embodiment, if the adaptive color palette graphic 40 includes three or more colors 44, then the head-up display 10 may first ask the user to distinguish between two colors 44 in response to receiving the user-generated negative input from the user input device 24. In other words, the head-up display 10 may first narrow the number of colors 44 included as part of the adaptive color palette graphic 40 in response to receiving the user-generated negative input. Specifically, the one or more controllers 20 may instruct the graphic projection module 22 to generate the adaptive color palette graphic 40 including only two of the colors 44, such as red and blue, along with a set of text instructions asking the user to distinguish between the two colors 44 that are part of the adaptive color palette graphic 40. The colors 44 that are presented as part of the adaptive color palette graphic 40 are used together as part of a particular graphic that is generated upon the windscreen 12 (e.g., if a graphic includes the colors red and blue, then these colors would be included as part of the adaptive color palette graphic 40.)

Figure 2B:
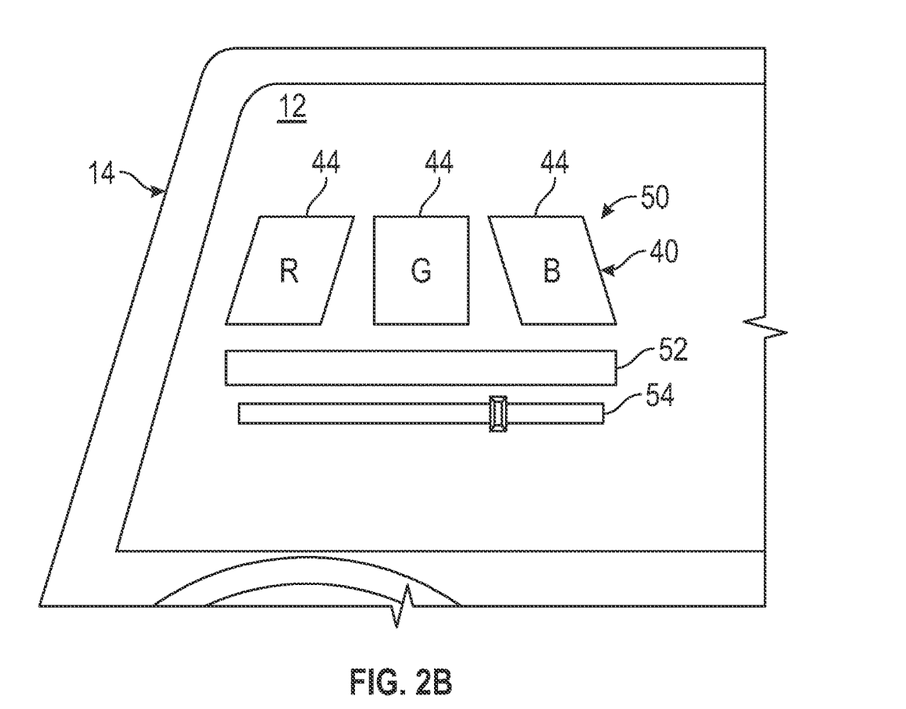
FIG. 2B is an interior view of the windscreen as the head-up display system generates a luminance adjustment graphic, a luminance adjustment set of text instructions, and an interactive luminance adjustment graphic, according to an exemplary embodiment.

Referring to FIGS. 1 and 2B, in response to receiving the user-generated negative input indicating that the user is unable to distinguish between the two or more colors 44, the one or more controllers 20 instruct the graphic projection module 22 to generate a luminance adjustment graphic 50. As seen in FIG. 2B, the luminance adjustment graphic 50 includes the adaptive color palette graphic 40 including the two or more colors 44, a luminance adjustment set of text instructions 52, and an interactive luminance adjustment graphic 54. In one embodiment, the two or more colors 44 that are part of the adaptive color palette graphic 40 include an initial default luminance value. In an embodiment, the initial default luminance value is a maximum level of luminance intensity. The adaptive color palette graphic 40 may also include a default saturation value. However, it is to be appreciated that the default saturation value may not be a maximum level of saturation intensity.

The luminance adjustment set of text instructions 52 instruct the user to adjust the luminance of a selected one of the colors 44 of the adaptive color palette graphic 40. More specifically, the luminance adjustment set of text instructions 52 may instruct the user to manipulate the user input device 24 to control the interactive luminance adjustment graphic 54. For example, in one embodiment, the luminance adjustment set of text instructions 52 may state "adjust the slider until the colors are distinguishable". The interactive luminance adjustment graphic 54 is an interactive graphic that includes a mechanism for allowing the user to adjust a level of luminance of the selected color 44 of the adaptive color palette graphic 40. In the example as shown in FIG. 2B, the interactive luminance adjustment graphic 54 is a slider bar, however, it is to be appreciated that other types of interactive graphics may be used as well.

The one or more controllers 20 receive, from the user input device 24, a user-generated luminance input indicating a change in the level of luminance in the selected color 44 of the adaptive color palette graphic 40. The user-generated luminance input is determined by the user adjusting the level of luminance of the selected color 44 by manipulating the interactive luminance adjustment graphic 54. It is to be appreciated that the change in luminance in the selected color 44 is selected by the user to discern differences between the two or more colors 44 that are part of the adaptive color palette graphic 40 caused by a color vision deficiency. That is, in other words, the user adjusts the level of luminance of the selected color 44 in order to tell the difference more clearly between the colors 44 of the adaptive color palette graphic 40 in order to accommodate a color vision deficiency. In response to receiving the user-generated luminance input, the one or more controllers 20 instruct the graphic projection module 22 to adjust the luminance of the selected color 44 based on the user-generated luminance input. For example, if the user-generated luminance input indicates the level of luminance of the selected color 44 is to be increased, then the one or more controllers 20 instruct the graphic projection module 22 to increase the level of luminance of the selected color 44.

In one embodiment, the user is able to discern differences between the two or more colors 44 based on the changes in the level of luminance in the selected color 44. In this instance, the one or more controllers 20 may receive a user-generated input from the user input device 24 indicating the user is able discern the differences between the colors 44 with the changes in the level of luminance. The one or more controllers 20 may then save the selected color 44 with the change in the level of luminance in memory. In an embodiment, the selected color 44 with the change in the level of luminance is saved in gray level format.

In other instances, the user may not be able to discern differences between the two or more colors 44 regardless of the changes in luminance in the selected color 44. That is, the user may adjust the level of luminance of the selected color 44 of the adaptive color palette graphic 40 to a maximum level or a minimum level of intensity without being able to discern differences between the two or more colors 44. In this instance, the one or more controllers 20 may receive a user-generated input from the user input device 24 indicating the user is still unable to discern the differences between the colors 44 despite the change in luminance. In response to receiving the user-generated input indicating the user is still unable to discern the differences between the colors 44, the one or more controllers 20 instruct the graphic projection module 22 to generate a saturation adjustment graphic 60, which is shown in FIG. 2C.

Figure 2C:
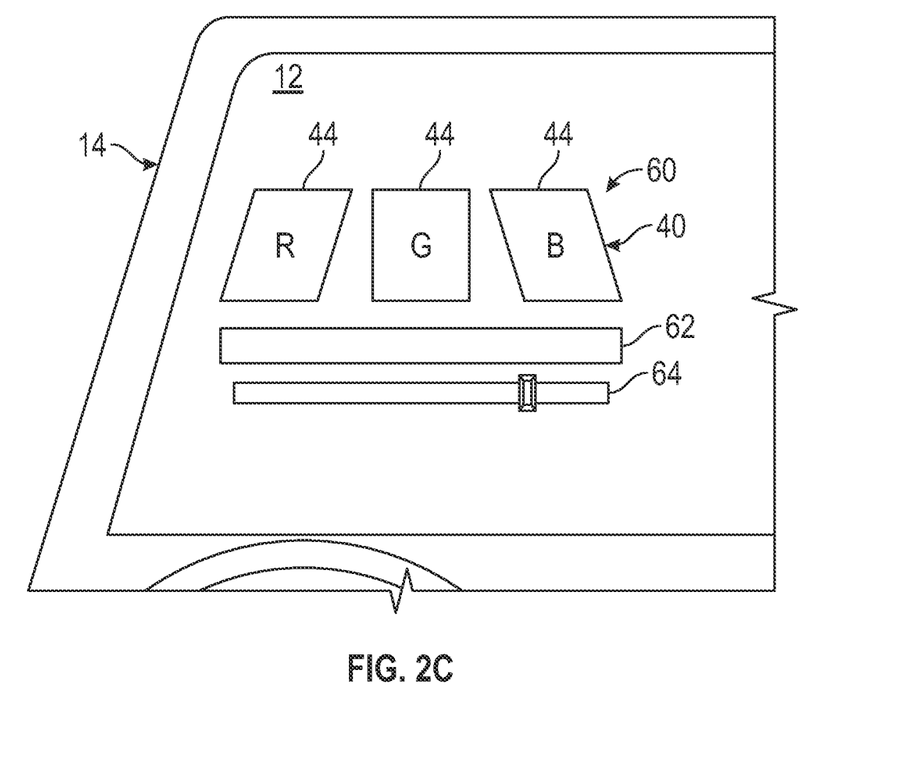
FIG. 2C is an interior view of the windscreen as the head-up display system generates a saturation adjustment graphic, a saturation adjustment set of text instructions, and an interactive saturation adjustment graphic, according to an exemplary embodiment.

Referring now to FIGS. 1 and 2C, the saturation adjustment graphic 60 includes the adaptive color palette graphic 40 including the two or more colors 44 that are adjusted for luminance, a saturation adjustment set of text instructions 62, and a saturation adjustment graphic 64. The saturation adjustment set of text instructions 62 instructs the user to adjust the saturation of a selected one of the colors 44. More specifically, the saturation adjustment set of text instructions 62 may instruct the user to manipulate the user input device 24 to control the saturation adjustment graphic 64. For example, in one embodiment, the saturation adjustment set of text instructions 62 may state "adjust the slider until the colors are distinguishable". The saturation adjustment graphic 64 is an interactive graphic that allows the user to adjust a level of saturation of the selected color 44 and in embodiments may be a slider bar.

The one or more controllers 20 receive, from the user input device 24, a user-generated saturation input indicating a change in the level of saturation in the selected color. The user-generated saturation input is determined by the user adjusting the level of saturation of the selected color 44 by manipulating the interactive saturation adjustment graphic 64 using the user input device 24. It is to be appreciated that the change in saturation in the selected color 44 is selected by the user to discern differences between the two or more colors 44 caused by a color vision deficiency. That is, in other words, the user adjusts the level of saturation of the selected color 44 in order to tell the difference more clearly between the colors 44 in order to accommodate a color vision deficiency. In response to receiving the user-generated saturation input, the one or more controllers 20 instruct the graphic projection module 22 to adjust the saturation of the selected color 44 based on the user-generated saturation input. For example, if the user-generated saturation input indicates the level of saturation of the selected color 44 is to be increased, then the one or more controllers 20 instruct the graphic projection module 22 to increase the level of saturation of the selected color 44. The one or more controllers 20 may then save the selected color 44 with the change in the level of saturation in memory, where the selected color 44 with the change in the level of saturation is saved in gray level format.

Figure 3:
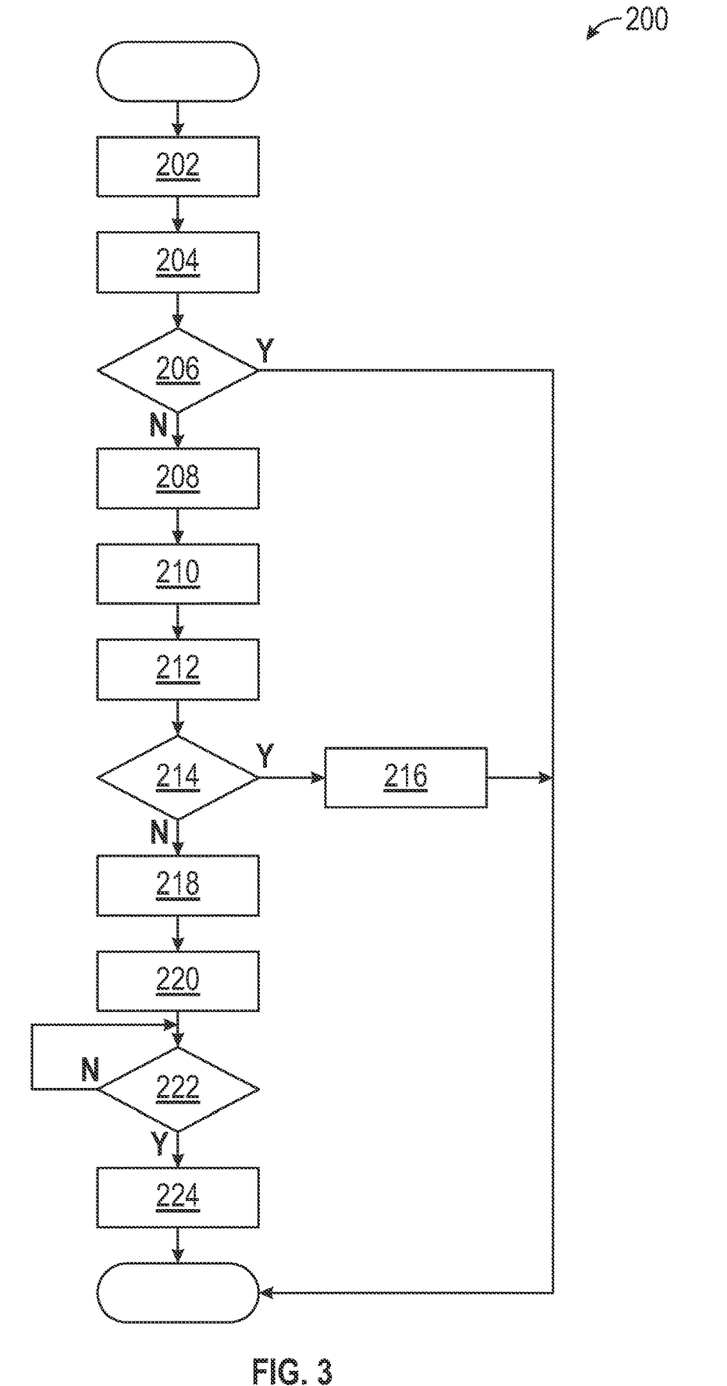
FIG. 3 is a process flow diagram illustrating a method for accommodating color vision deficiencies of a user of the vehicle using the head-up display system shown in FIG. 1, according to an exemplary embodiment.

FIG. 3 is a process flow diagram illustrating a method 200 for accommodating color vision deficiencies of the user of the vehicle 14 by adjusting the level of luminance and saturation of the two or more colors 44 of the adaptive color palette graphic 40. Referring generally to FIGS. 1, 2A, 2B, 2C, and 3, the method 200 may begin at block 202. In block 202, the one or more controllers 20 receive the prompt to initiate the color adjustment mode. The method 200 may then proceed to block 204.

In block 204, in response to receiving the prompt, the one or more controllers 20 instruct the graphic projection module 22 to generate the adaptive color palette graphic 40 including the two or more colors 44 in combination with the initial set of text instructions 42, which are shown in FIG. 2A. As mentioned above, the initial set of text instructions 42 ask the user to distinguish between the two or more colors 44 that are part of the adaptive color palette graphic 40. The method 200 may then proceed to decision block 206.

In decision block 206, if the user is able to see the differences between the colors 44, then the one or more controllers 20 receive the user-generated input from the user input device 24 indicating a positive answer, and method 200 may then terminate. However, if the user is unable to see the differences between the colors 44, then the one or more controllers 20 receive the user-generated negative input from the user input device 24 indicating that it is not possible to distinguish between the two or more colors 44. The method 200 may then proceed to block 208.

In block 208, the in response to receiving the user-generated negative input, the one or more controllers 20 instruction the graphic projection module 22 to generate the luminance adjustment graphic 54, which is shown in FIG. 2B. The method 200 may then proceed to block 210.

In block 210, the one or more controllers 20 receive, from the user input device 24, the user-generated luminance input indicating the change in a level of luminance in the selected color 44 of the adaptive color palette graphic 40. As mentioned above, the change in the level of luminance in the selected color 44 is selected by the user to discern differences between the two or more colors 44 caused by a color vision deficiency. The method 200 may then proceed to block 212.

In block 212, in response to receiving the user-generated luminance input, the one or more controllers 20 instruct the graphic projection module 22 to adjust the level of luminance of the selected color 44 based on the user-generated luminance input. The method 200 may then proceed to decision block 214.

In decision block 214, if the user is able to discern differences between the two or more colors 44 based on the changes in the level of luminance in the selected color 44, then the one or more controllers 20 may receive the user-generated input from the user input device 24 indicating the user is able discern the differences between the colors 44 with the changes in the level of luminance. The method 200 may then proceed to block 216, where the one or more controllers 20 save the selected color 44 with the change in the level of luminance in memory, and the method 200 may then terminate. However, if the user is unable to discern differences between the two or more colors 44 regardless of the changes in luminance in the selected color 44, then the one or more controllers 20 may receive a user-generated input from the user input device 24 indicating the user is still unable to discern the differences between the colors 44 despite the change in luminance. The method 200 may then proceed to block 218.

In block 218, in response to receiving the user-generated input indicating the user is still unable to discern the differences between the colors 44, the one or more controllers 20 instruct the graphic projection module 22 to generate the saturation adjustment graphic 60, which is shown in FIG. 2C. The method 200 may then proceed to block 220.

In block 220, the one or more controllers receive, from the user input device 24, the user-generated saturation input indicating the change in a level of saturation in the selected color. The method 200 may then proceed to decision block 222.

In decision block 222, in response to receiving the user-generated saturation input, the one or more controllers 20 instruct the graphic projection module 22 to adjust the level of saturation of the selected color 44 based on the user-generated saturation input. It is to be appreciated that the user may continue to adjust the level of saturation of the selected color 44 until he or she is able to discern the differences between the colors 44 that are part of the adaptive color palette graphic 40. Once the user is able to discern the differences between the colors 44, the method 200 may then proceed to block 224.

In block 224, the one or more controllers 20 execute instructions to save the selected color 44 with the change in the level of saturation of the selected color 44 in the memory of the one or more controllers 20. The method 200 may then terminate.

Referring generally to the figures, the disclosed head-up display provides various technical effects and benefits. Specifically, the disclosure provides a relatively simple, cost-effective approach to allow the user to adjust the colors generated by the head-up display to accommodate color vision deficiencies. It is to be appreciated that the type as well as the severity of color vision deficiency may vary between various individuals. The disclosed head-up display also provides a customized approach for accommodating individual differences in color vision deficiencies.

The controllers may refer to, or be part of an electronic circuit, a combinational logic circuit, a field programmable gate array (FPGA), a processor (shared, dedicated, or group) that executes code, or a combination of some or all of the above, such as in a system-on-chip. Additionally, the controllers may be microprocessor-based such as a computer having a at least one processor, memory (RAM and/or ROM), and associated input and output buses. The processor may operate under the control of an operating system that resides in memory. The operating system may manage computer resources so that computer program code embodied as one or more computer software applications, such as an application residing in memory, may have instructions executed by the processor. In an alternative embodiment, the processor may execute the application directly, in which case the operating system may be omitted.

The description of the present disclosure is merely exemplary in nature and variations that do not depart from the gist of the present disclosure are intended to be within the scope of the present disclosure. Such variations are not to be regarded as a departure from the spirit and scope of the present disclosure.

What is claimed is:

1. A head-up display for displaying graphics upon a windscreen of a vehicle, the head-up display comprising:
   a graphic projection module including a projection device that creates an excitation light for generating images upon the windscreen of the vehicle;
   a user input device for receiving user-generated commands created by a user of the vehicle, wherein the user input device is one of the following: a touchscreen, a keyboard, a microphone, and a gesture sensor; and
   one or more controllers in electronic communication with the graphic projection module and the user input device, wherein the one or more controllers executes instructions to:
      instruct the graphic projection module to generate an adaptive color palette graphic including three or more colors;
      receive, from the user input device, a user-generated negative input indicating the user is unable to distinguish between the three or more colors;
      in response to receiving the user-generated negative input, instruct the graphic projection module to generate a luminance adjustment graphic, wherein the luminance adjustment graphic includes the adaptive color palette graphic including two or more colors that include only two of the three or more colors;
      receive, from the user input device, a user-generated luminance input indicating a change in a level of luminance in a selected color, wherein the change in the level of luminance in the selected color is selected by the user to discern differences between the two or more colors caused by a color vision deficiency; and
      in response to receiving the user-generated luminance input, instruct the graphic projection module to adjust the level of luminance of the selected color based on the user-generated luminance input.

2. The head-up display of claim 1, wherein the one or more controllers execute instructions to:
instruct the graphic projection module to generate a luminance adjustment set of text instructions, wherein the luminance adjustment set of text instructions instruct the user to adjust the level of luminance of the selected color.

3. The head-up display of claim 2, wherein the one or more controllers execute instructions to:
instruct the graphic projection module to generate an interactive luminance adjustment graphic, wherein the interactive luminance adjustment graphic includes a mechanism for allowing the user to adjust the level of luminance of the selected color.

4. The head-up display of claim 1, wherein the one or more controllers execute instructions to:
receive a user-generated input from the user input device indicating the user is unable to discern differences between the two or more colors that are part of the adaptive color palette graphic despite the change in the level of luminance in the selected color; and
in response to receiving the user-generated input indicating the user is unable to discern the differences between the two or more colors that are part of the adaptive color palette graphic, instruct the graphic projection module to generate a saturation adjustment graphic.

5. The head-up display of claim 4, wherein the one or more controllers execute instructions to:
receive, from the user input device, a user-generated saturation input indicating a change in a level of saturation in the selected color, wherein the change in the level of saturation of the selected color is selected by the user to discern differences between the two or more colors caused by a color vision deficiency; and
in response to receiving the user-generated saturation input, instruct the graphic projection module to adjust the level of saturation of the selected color based on the user-generated saturation input.

6. The head-up display of claim 5, wherein the one or more controllers execute instructions to:
save the selected color with the change in the level of saturation of the selected color in memory of the one or more controllers.

7. The head-up display of claim 4, wherein the one or more controllers execute instructions to:
instruct the graphic projection module to generate a saturation adjustment set of text instructions, wherein the saturation adjustment set of text instructions instruct the user to adjust the level of saturation of the selected color.

8. The head-up display of claim 4, wherein the one or more controllers execute instructions to:
instruct the graphic projection module to generate an interactive saturation adjustment graphic, wherein the interactive saturation adjustment graphic includes a mechanism for allowing the user to adjust the level of saturation of the selected color.

9. The head-up display of claim 1, wherein the one or more controllers execute instructions to:
instruct the graphic projection module to generate an initial set of text instructions that are displayed along with the adaptive color palette graphic, wherein the initial set of text instructions are displayed alongside and ask the user to distinguish between the two or more colors that are part of the adaptive color palette graphic.

10. The head-up display of claim 9, wherein the one or more controllers execute instructions to:
receive, from the user input device, a user-generated negative input indicating the user is unable to distinguish between the two or more colors; and
in response to receiving the user-generated negative input, instruct the graphic projection module to generate the luminance adjustment graphic.

11. The head-up display of claim 1, wherein the three or more colors include red, green, and blue.

12. The head-up display of claim 1, wherein the two or more colors are red and blue.

13. The head-up display of claim 1, wherein the two or more colors that are part of the adaptive color palette graphic include a default luminance value.

14. The head-up display of claim 13, wherein the default luminance value is a maximum level of luminance intensity.

15. A method for displaying graphics upon a windscreen of a vehicle by a head-up display, the method comprising:
instructing, by one or more controllers, a graphic projection module including a projection device that creates an excitation light to generate an adaptive color palette graphic including three or more colors;
receiving, from a user input device, a user-generated negative input indicating the user is unable to distinguish between the three or more colors, wherein the user input device is one of the following: a touchscreen, a keyboard, a microphone, and a gesture sensor;
in response to receiving the user-generated negative input, instructing, by the one or more controllers, a graphic projection module to generate a luminance adjustment graphic, wherein the luminance adjustment graphic includes the adaptive color palette graphic including two or more colors that include only two of the three or more colors, wherein the one or more controllers are in electronic communication with the graphic projection module and a user input device;
receiving, from the user input device, a user-generated luminance input indicating a change in a level of luminance in a selected color, wherein the change in the level of luminance in the selected color is selected by a user to discern differences between the two or more colors caused by a color vision deficiency; and
in response to receiving the user-generated luminance input, instructing the graphic projection module to adjust the level of luminance of the selected color based on the user-generated luminance input.

16. The method of claim 15, further comprising:
receiving a user-generated input from the user input device indicating the user is unable to discern differences between the two or more colors that are part of the adaptive color palette graphic despite the change in the level of luminance in the selected color; and
in response to receiving the user-generated input indicating the user is unable to discern the differences between the two or more colors that are part of the adaptive color palette graphic, instructing the graphic projection module to generate a saturation adjustment graphic.

17. The method of claim 16, further comprising:
receiving, from the user input device, a user-generated saturation input indicating a change in a level of saturation in the selected color, wherein the change in the level of saturation of the selected color is selected by the user to discern differences between the two or more colors caused by a color vision deficiency; and
in response to receiving the user-generated saturation input, instructing the graphic projection module to adjust the level of saturation of the selected color based on the user-generated saturation input.

18. The method of claim 17, further comprising:
saving the selected color with the change in the level of saturation of the selected color in memory of the one or more controllers.

19. The method of claim 15, further comprising:
instructing the graphic projection module to generate an initial set of text instructions that are displayed along with the adaptive color palette graphic, wherein the initial set of text instructions are displayed alongside and ask the user to distinguish between the two or more colors that are part of the adaptive color palette graphic.

20. A head-up display for displaying graphics upon a windscreen of a vehicle, the head-up display comprising:
a graphic projection module including a projection device that creates an excitation light for generating images upon the windscreen of the vehicle;
a user input device for receiving user-generated commands created by a user of the vehicle, wherein the user input device is one of the following: a touchscreen, a keyboard, a microphone, and a gesture sensor; and
one or more controllers in electronic communication with the graphic projection module and the user input device, wherein the one or more controllers executes instructions to:
instruct the graphic projection module to generate an adaptive color palette graphic including three or more colors;
receive, from the user input device, a user-generated negative input indicating the user is unable to distinguish between the three or more colors;
in response to receiving the user-generated negative input, instruct the graphic projection module to generate a luminance adjustment graphic, wherein the luminance adjustment graphic includes the adaptive color palette graphic including two or more colors that include only two of the three or more colors;
receive, from the user input device, a user-generated luminance input indicating a change in a level of luminance in a selected color, wherein the change in the level of luminance in the selected color is selected by the user to discern differences between the two or more colors caused by a color vision deficiency;
in response to receiving the user-generated luminance input, instruct the graphic projection module to adjust the level of luminance of the selected color based on the user-generated luminance input;
receive a user-generated input from the user input device indicating the user is unable to discern differences between the two or more colors that are part of the adaptive color palette graphic despite the change in the level of luminance in the selected color; and
in response to receiving the user-generated input indicating the user is unable to discern the differences between the two or more colors that are part of the adaptive color palette graphic, instruct the graphic projection module to generate a saturation adjustment graphic.

\* \* \* \* \*